April 5, 1949.  R. C. PALMER, JR  2,466,268
FUEL AND IGNITION CONTROL
Filed June 25, 1945  3 Sheets-Sheet 1

Inventor
Robert C. Palmer Jr.
by H. Hume Mathews
Attorney

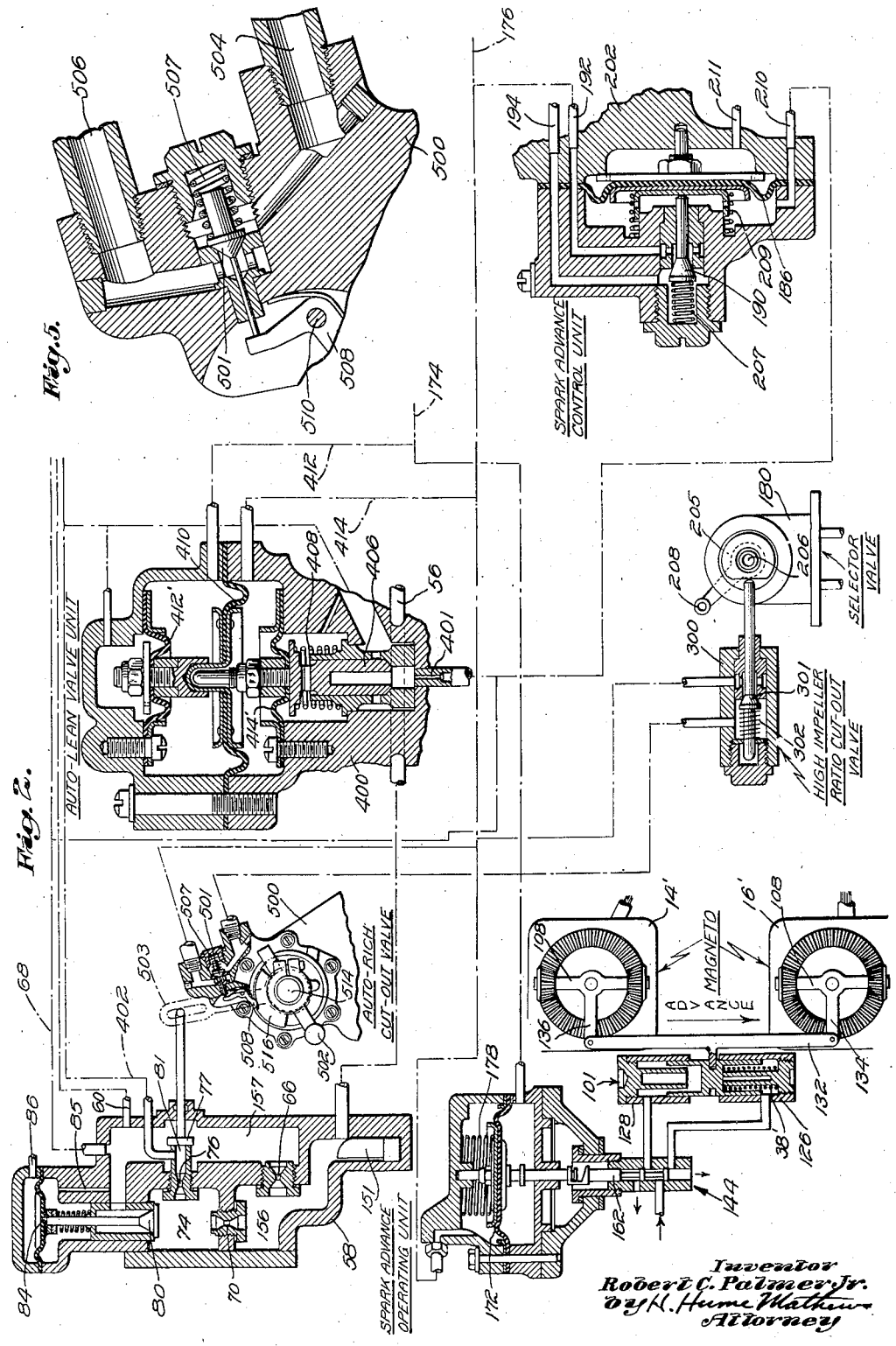

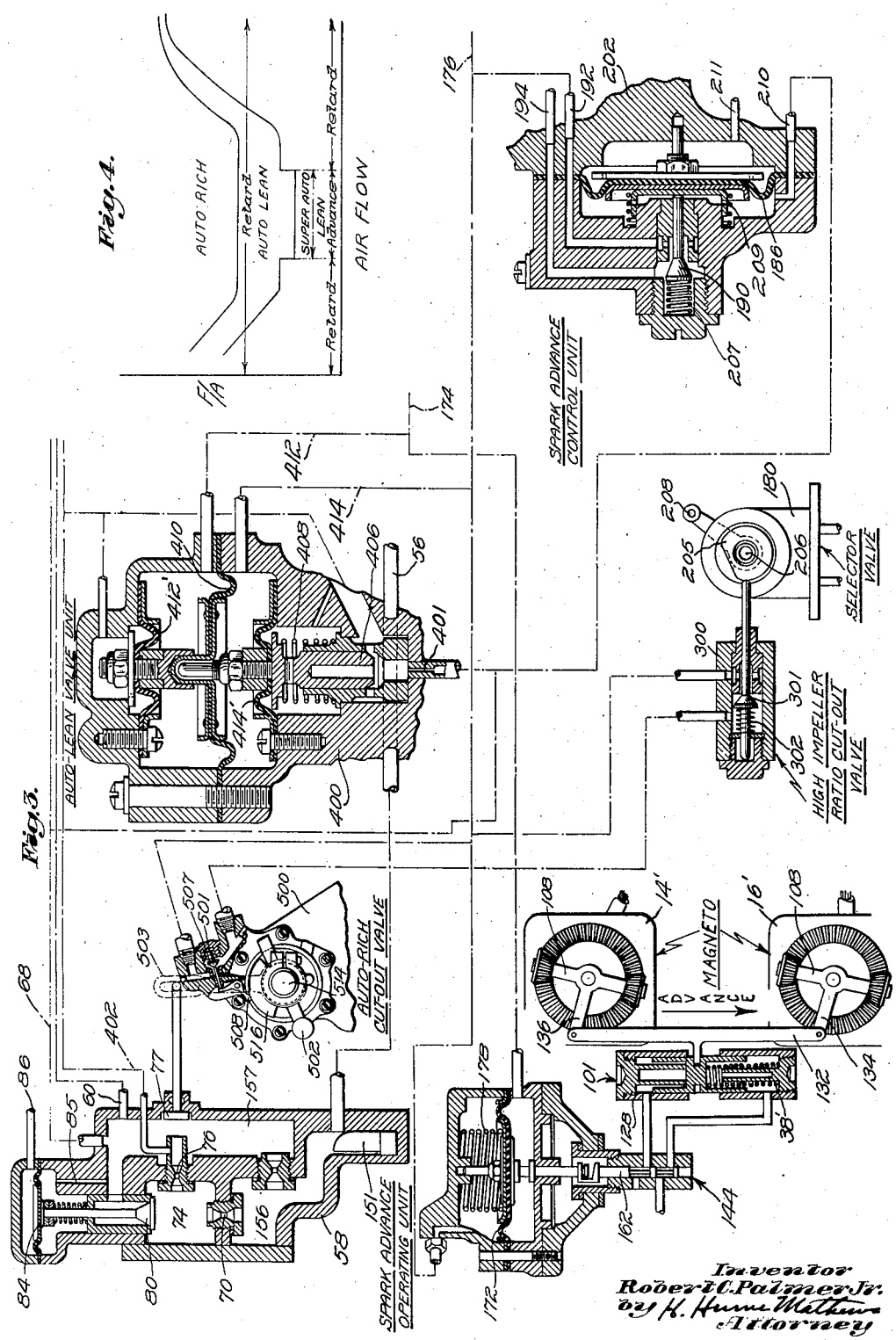

Patented Apr. 5, 1949

2,466,268

UNITED STATES PATENT OFFICE 2,466,268

FUEL AND IGNITION CONTROL

Robert C. Palmer, Jr., West Hartford, Conn., assignor to United Aircraft Corporation, East Hartford, Conn., a corporation of Delaware Application June 25, 1945, Serial No. 601,440

13 Claims. (Cl. 123—117)

1

This invention relates to the control of fuel and ignition systems for engines, particularly aircraft engines, and represents an improvement on the invention disclosed and claimed in Hahn application Serial No. 601,439, filed concurrently herewith, assigned to applicant's assignee, now Patent #2,460,383, dated February 1, 1949.

An object of this invention is to provide improved actuating means for a mixture strength control.

Another object is to provide improved means for synchronously controlling the ignition timing and mixture strength of an engine.

A further object is to provide a novel control apparatus, particularly for internal combustion aircraft engines.

Other objects and advantages will be apparent from the specification and claims, and from the accompanying drawings which illustrate what is now considered to be a preferred embodiment of the invention.

In the drawings, Fig. 1 is a schematic view showing a fuel and ignition control apparatus constructed according to the teaching of this invention, with the control devices shown in the below cruising power position.

Fig. 2 is a schematic view showing the control devices of Fig. 1 in cruising power position.

Fig. 3 is a schematic view showing the control devices of Fig. 1 in the above cruising power position.

Fig. 4 shows schematically fuel-air ratio curves such as may be obtained with the control apparatus of Figs. 1, 2 and 3.

Fig. 5 is an enlarged view of the auto-rich cut-off valve.

Figure 1:
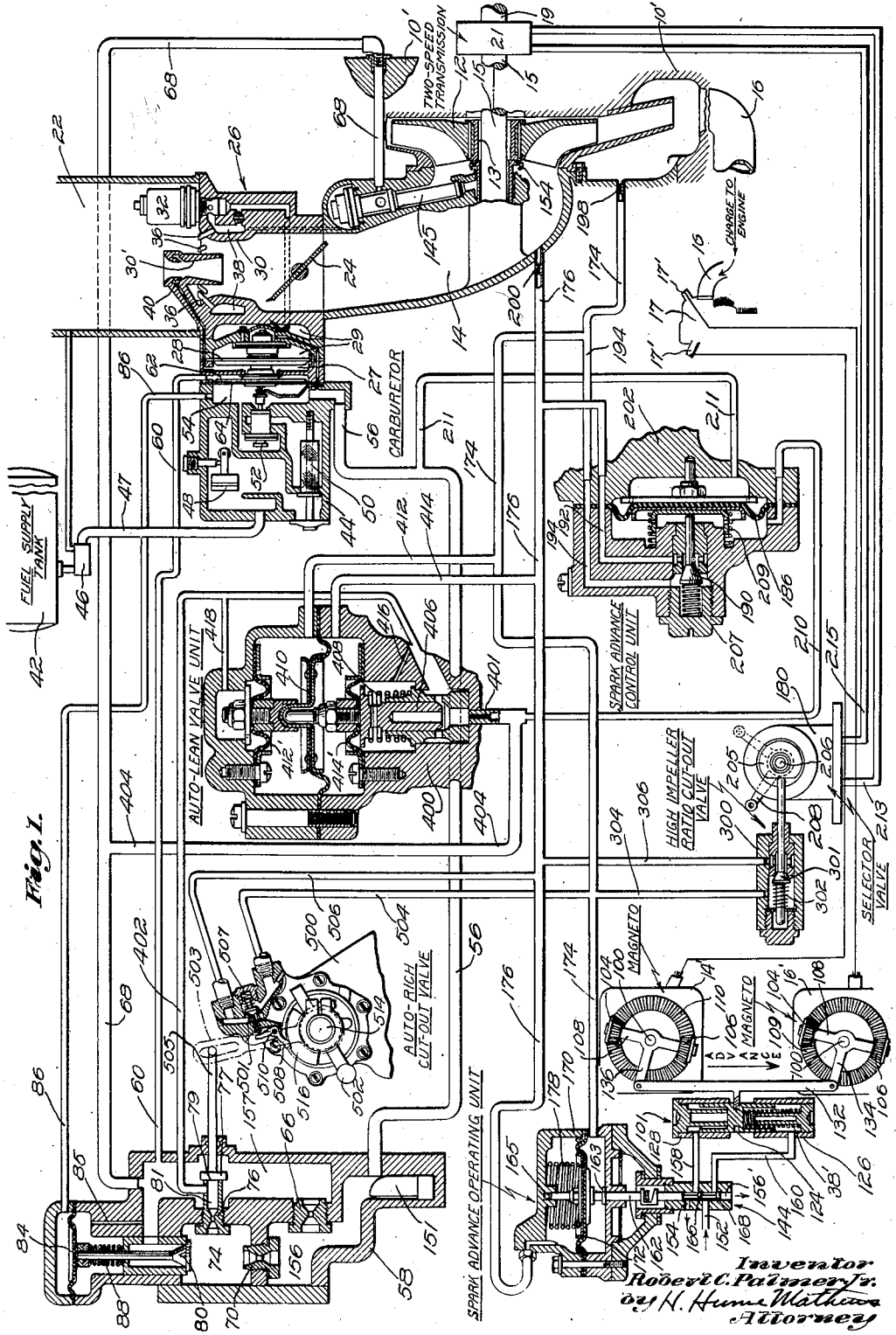

The embodiment of the invention shown in the drawings is particularly adapted for use with aircraft engines having engine driven superchargers, preferably of the two speed gear driven type but it is to be understood that the invention is not limited to such use.

In the Hahn application, referred to above, the mixture strength of an engine may be varied in accordance with spark advance by means effective only when the engine is operated with an "auto-lean" mixture setting.

This same result is accomplished by the present invention and, in addition, the mixture strength control is actuated in a novel manner. According to the present invention, when the spark is advanced or retarded the mixture strength, under auto-lean conditions, may always be correspondingly changed simultaneously therewith.

Referring to the embodiment of the invention

2 selected for illustration in the drawings, a radial aircraft engine having air-cooled cylinders, one of which is shown at 17, is supplied with charging fluid (air or air and fuel) by a main stage supercharger impeller 12 mounted in a supercharger or blower case, a portion of which is shown at 10'. The impeller is splined at 13 to a shaft 15 driven in a known manner by the engine crankshaft 19 through a two-speed gear train or transmission diagrammatically shown at 21, which may, for instance, be similar to those disclosed and claimed in Hobbs Patent No. 2,323,601, dated July 6, 1943, and in Hobbs-Willgoos application, Serial No. 492,423, filed June 26, 1943, assigned to applicant's assignee, now Patent #2,400,307, dated May 14, 1946.

Intake air is supplied to the supercharger inlet or throat 14 by a manifold 22 connected either directly to a scoop or ram positioned in the free airstream flowing over the aircraft or to the outlet of an auxiliary supercharger stage. The rate of flow by weight of intake air, and therefore engine power output, is controlled by throttle 24.

Air passing to the engine is measured by carburetor metering section 26 comprising main venturi 30, auxiliary venturi 30' and impact tubes 36, which cooperate to produce throat and scoop pressures in chambers 40 and 38, respectively.

These pressures, as corrected for variations in density by altitude compensator 32, are admitted to chambers 27, 29 on opposite sides of air diaphragm 28. The resultant force exerted by the diaphragm on fuel flow regulating valve 52 is a function of the rate of flow by weight of intake air and urges the valve toward open position.

Fuel is supplied to valve 52 by pump 46 from tank 42 through line 47 and strainer 50. A vapor trap including float valve 48 may be provided to eliminate gases from the liquid fuel, which is preferably gasoline.

Fuel in an amount controlled by valve 52 flows through unmetered fuel chamber 54 and line 56 to the fuel control body or metering jet section 58. After being metered in control body 58, the fuel passes through the metered fuel line 68 to the fuel discharge valve 145 and then into the fuel spinner 154 which sprays it into the air entering the vaned passages of impeller 12.

A fuel diaphragm 64 separates the unmetered fuel chamber 54 from a chamber 62, subjected by line 60 to the metered fuel pressure on the downstream side of the metering jets in the control 58. The resultant force exerted by this diaphragm on fuel valve 52 is dependent upon the fuel pressure drop across the metering jets, and urges the valve toward closed position. Fuel and air diaphragms 64, 28 and fuel valve 52 act to maintain a pressure drop across the metering jets between the unmetered and metered lines 56, 68 which is proportional to the compensated air pressure drop between the throat chamber 40 and the scoop chamber 38, thus regulating the rate of flow by weight of fuel to the engine in predetermined ratio to the rate of flow by weight of engine intake air, throughout the engine operating range.

This fuel-air ratio may be varied by controlling the jets in the fuel control body 58. The basic fuel-air ratio throughout the engine operating range is established by the main or cruise jet 66, which is continuously open. In addition to the flow through this jet, fuel may also flow from the unmetered jet chamber 156 through the economizer jet 70 into the chamber 74 and then through the auto-rich jet 76 into the metered jet chamber 157, when the auto-rich valve 77 is open as shown in Fig. 3. Jet 76 has a greater restriction than jet 70. Therefore, assuming valve 80 to be closed, the mixture is enriched by an amount determined substantially by the size of jet 76 when valve 77 is open.

It is desirable under high engine power output conditions to provide additional enrichment or higher mixture strengths to prevent detonation, and for other purposes. This is accomplished by economizer valve 80 operated by diaphragm 84 subjected to metered fuel pressure through passage 85 and unmetered fuel pressure through line 86. When the fuel pressure drop becomes sufficiently high, valve 80 is opened against the force of spring 88 to provide additional fuel in an amount determined by the value of the fuel pressure drop, the rate of spring 88 and the contour of valve 80, up to a maximum quantity determined by the size of economizer jet 70, which imposes a limit on the maximum flow permitted through both valve 80 and jet 76. Fuel enrichment occurs regardless of whether or not the carburetor is in the auto-rich position in which valve 77 is open, or in the auto-lean position in which valve 77 closes the opening 79 and thereby shuts off the flow of fuel through jet 76. For the moment, flow of fuel through jet 76 by way of line 402 will be disregarded.

Idle valve 151, linked in a known manner with the throttle 24, is moved to a metering position, in which it restricts the flow from the end of unmetered fuel line 56 and thereby controls the mixture strength, when the throttle is closed and the engine is idling. When the throttle is open, idle valve 151 has no appreciable effect on the mixture strength.

According to the present invention, the above described fuel control apparatus, which is more fully disclosed in Palmer application, Serial No. 529,104, filed April 1, 1944, assigned to applicant's assignee, is modified and correlated with the engine ignition control apparatus as follows.

An extra lean metering jet 401, which has a greater restriction than jet 76 and which is controlled by a two-position auto-lean valve unit 400, is supplied with fuel by line 402 from chamber 81 between the downstream side of the jet 76 and the opening 79. When valve 77 is open, fuel may flow directly from jet 76 and chamber 81 to chamber 157. When valve 77 closes opening 79, fuel may flow through jet 76 and from chamber 81 only by way of line 402, jet 401 and line 404, to the metered fuel line 68 and thence to the engine. Such flow through the extra lean jet 401 will be terminated by the closing of fuel valve 406. Flow through jet 401 will also terminate when valve 77 is moved to open position, because then there will be no pressure drop between the chamber 81 and the metered fuel chamber 157, or the metered fuel line 68. Because under such circumstances there is no pressure drop across jet 401, there will be no flow therethrough regardless of whether valve 406 is open or closed. Thus, jet 401 and valve 406 are disabled, or rendered ineffective to change the fuel-air ratio, when the engine is operated in the rich mixture setting, or under "auto-rich" conditions.

Valve 406 is biased to open position by a spring 408 and is closed by a predetermined pressure difference between the fluid pressure lines 174, 176 of the ignition control system. Sealing diaphragms 412', 414', backed by fuel pressure from passages 413, 416 connected to line 402, cooperate with the valve actuating diaphragm 410 to form fluid tight chambers on opposite sides of diaphragm 410. These chambers are connected to lines 174, 176 by pipes 412, 414, respectively.

The engine ignition system comprises magnetos 14', 16' which supply ignition current at timed intervals to spark plugs 17' of the engine cylinders 17. The magnetos are driven from the engine crankshaft by gear trains including magneto drive gears 109, 110 in a manner more fully disclosed in Jarvis application Serial No. 481,114, filed March 30, 1943, now Patent #2,380,967, dated August 7, 1945, to which reference is made for a more complete disclosure of the basic ignition system referred to herein.

For changing the timing of the magnetos, or the time at which ignition current is supplied to the spark plugs with respect to piston position, the magneto gear trains are each provided with bevel idler gears 104, 106 mounted on cages 108 rotatably supported on the magneto shafts 100, to which gears 109, 110 are fixed. Cages 108 are connected by arms 134, 136 to a cross bar or link 132 attached to the piston 124 of a servo motor 101. When pressure fluid such as oil is admitted to one or the other of cylinders 126, 128 of the servo motor the piston 124 will be reciprocated to move link 132 and retard or advance the ignition timing. A spring 38' biases piston 124 to retard position.

Servo motor 101 is controlled by a spark advance operating unit 144 including a servo valve 162 having lands 166, 168 which control the admittance of oil under pressure from the supply line 152 to the lines 158, 160 respectively attached to cylinders 128, 126. Drains 154, 156' are provided for relieving pressure in one cylinder as pressure fluid is admitted to the other.

Valve 162 is actuated by diaphragm 172 subjected to the pressure difference between fluid lines 174, 176, which are respectively connected through restriction 198 to the blower outlet and through restriction 200 to the blower inlet. Thus the chamber portion 170 of the spark advance operating unit is divided by diaphragm 172 into two chambers connected to blower throat and blower rim.

A spring 178 maintains valve 162 in its downward or retard position, determined by the stop 163. When the force exerted by the fluid pressures on diaphragm 172 is sufficient to overcome the force of spring 178, valve 162 is moved upwardly to its advance position, determined by the abutment of the stop 165 against chamber 170.

Under some conditions it is desirable to maintain the spark retarded even when the supercharger pressure rise is sufficiently high to hold valve 162 in advance position. For this purpose by-pass valves 190, 301, and 501 are provided. When any one of these valves is opened, the effect is to bleed or by-pass air from the blower rim line 174 to the blower throat line 176. Restrictions 198, 200 are made of such value in relation to the size of valves 190, 301, 501 that the opening of any one of these three valves will approximately equalize the pressure in lines 174, 176, thereby disabling the ignition timing mechanism, or rendering it ineffective to advance the spark, by causing the pressures on opposite sides of the diaphragm in chamber 170 to become substantially equalized and enabling spring 178 to maintain or return valve 162 to the retard position.

By-pass valve 190 of the spark advance control unit 202 is controlled by a fuel head diaphragm 186 subjected to unmetered fuel pressure by line 211 and to metered fuel pressure by lines 210 and 404. Thus the force exerted by diaphragm 186 on valve 190 is determined by the fuel pressure drop which is in turn determined by the rate of flow by weight of engine intake air. Consequently diaphragm 186 will open valve 190 against the force of springs 206, 207 when the engine power output reaches a predetermined value.

By-pass valve 301 in the high blower cut-out 300 is opened or closed by a cam 205 on the selector valve shaft 206 in the selector valve 180. Shaft 206 is actuated by an operating handle 208, which controls the application of pressure fluid to transmission 21 through lines 213, 215 to thereby regulate the gear ratio, or the speed ratio, of the transmission, in a known manner, for instance like that disclosed in the Hobbs patent or the Hobbs-Willgoos application referred to above. When the impeller 12 is being driven by the engine in the high transmission ratio the resultant temperature rise of the air passing through the supercharger is so great that it is desirable to maintain the spark in retarded position, in order to prevent detonation and for other reasons. When the blower is being driven in the low gear ratio this is not necessary. Therefore cut-out 300 is so arranged that when shaft 206 and handle 208 are in the low blower position (as shown by the full lines), in which the supercharger drive is placed in low speed ratio, valve 301 is maintained in closed position by the spring 302 and the spark advance unit 144 operates in its normal manner. But when shaft 206 is rotated to its alternative or high blower position (corresponding to the dotted line position of handle 208) in which the supercharger drive is placed in the high speed ratio, the cam 205 forces valve 301 to the left against the force of spring 302, establishing a bleed between the rim and throat lines 174, 176 by way of passages 304, 306. Thus when valve shaft 206 and handle 208 are in the high impeller ratio position, valve 301 will be opened and the operating unit 144 will be maintained in the spark retard position regardless of the value of the supercharger pressure rise.

By-pass valve 501 in the mixture control 500 is actuated by handle 502. When the handle is moved to change the mixture setting of the carburetor, shaft 514, fixed thereto, is rotated to angularly adjust yoke 503 connected to valve lever 505, thereby shifting valve 77 to close or open the port 79. Movement of shaft 514 also angularly shifts a cam 516, keyed to the shaft, to close or open bleed valve 501 against the force of spring 507 by means of bell crank 508, fulcrumed at 510. The levers and cam are so arranged that whenever handle 502 is in the auto-rich position valves 77 and 501 are both open and when the handle is in auto-lean position valves 77 and 501 are both closed. A bleed or by-pass is established between lines 174, 176 through pipes 504, 506 when valve 501 is open.

*Operation*

A. With the engine operating below the cruising range the spark is in the "normal" or retard position and the several units of the mechanism are in the positions shown in Fig. 1. The mixture setting can be either auto-lean (as shown) or auto-rich.

B. When engine operation reaches the cruising range (Fig. 2), and the pilot wishes to cruise with maximum economy, the following sequence of events takes place:

1. The mixture control lever 502 is maintained or placed in the auto-lean position in which mixture valve 77 and the air by-pass valve 501 are closed.

2. The pressure differential between supercharger throat and collector rim lines 176, 174 forces up the diaphragm 172 of the operating unit 144. This moves the spark advance valve plunger 162 upwardly from the "normal" to the "cruising" or advance position, thereby admitting engine pressure oil to the "cruising" side of the spark advance piston. This in turn, moves the piston downwardly which, acting through the yoke linkage and beveled pinions, turns the magnetos forward into the "cruising" or spark advanced position.

3. The pressure differential between supercharger throat and collector rim also forces down the diaphragm 410 of the two-position auto-lean valve unit 400. This closes the valve 406 which, by shutting off the fuel flow through restriction 401, sets the carburetor in the "super-auto-lean" or "extra-lean" position.

C. As engine operation is continued up into the high power range (Fig. 3), a second cycle of events occurs:

1. The increased airflow raises the pressure of the unmetered fuel in the carburetor and increases the pressure differential between metered and unmetered fuel. This pressure differential forces the diaphragm of the control unit 202 to the left; opens the air by-pass valve 190; and thus equalizes the pressure between the supercharger throat and collector rim lines.

2. Since an effective pressure differential no longer exists across the diaphragm of the operating unit 144, the diaphragm spring 178 returns the spark advance valve plunger 162 to the "normal" position, thereby admitting engine pressure oil to the "normal" side of the spark advance piston. This, in turn, moves the piston upwardly which, acting through the yoke linkage and the beveled pinions, returns the magnetos to the "normal" or retard position. Spring 38' aids this movement.

3. Since an effective pressure differential no longer exists across the diaphragm of the two-position auto-lean valve unit, the diaphragm spring 403 opens the valve, thereby opening jet 401 and restoring the normal flow of fuel for normal running conditions.

D. Operation in the "cruising spark advance" position or in the "super-auto lean" position is prevented in either high impeller gear ratio or automatic rich mixture setting, since no effective pressure differential can exist across the diaphragm of the operating unit 144 and two-position auto-lean valve unit 400 because:

1. The air by-pass valve 501 of the auto-rich cut-out valve 500 is opened whenever the mixture control lever is placed in the auto-rich position, thus equalizing the pressure between the supercharger throat and collector rim lines.

2. Similarly, the air by-pass valve 301 of the high impeller ratio cut-out valve 300 is opened by the cam 205 of the selector valve 180 whenever the shift to the high impeller gear ratio is made, thus equalizing the pressure between the supercharger throat and collector rim lines.

E. As engine operation is returned from the high power to the cruising range, the normal sequence of events is as follows:

1. As intake airflow and engine power decrease, the pressure differential between metered and unmetered fuel in the carburetor also decreases. When the airflow has dropped to a figure slightly less than that at which the air bypass valve of the control unit 202 opened, the fuel pressure differential is so low as to allow the diaphragm spring 209 to force the diaphragm back to the right and permit the air by-pass valve 190 to be closed by its spring 207.

2. As the mixture control lever is moved back to the auto-lean position the air by-pass valve 501 in the auto-rich cut-out valve unit 500 is closed, thereby closing connection 504, 506 between supercharger throat and collector rim lines.

3. The pressure differential between supercharger throat and collector rim then acts as before on diaphragm 172 to set the spark in the "cruising advance" position and on diaphragm 419 to set the mixture in the "super-auto-lean" position.

F. Engine operation in the cruising range is assumed to be in low impeller gear ratio. If it is not, the spark cannot be set in the "cruising advance" position because by-pass valve 301 is held open by cam 205 when the selector valve 180 is in low impeller gear ratio position.

G. Finally, as engine operation is carried below cruising range, the pressure differential across the diaphragm of the operating unit 144 is no longer great enough to hold the valve plunger 162 in the "cruising advance" position, or to close the valve 406 of the two-position auto-lean valve unit 400. Accordingly, the spark returns to "normal" position, and the carburetor to a "normal" setting.

Fig. 4 shows schematically one example of fuel air ratio curves and ignition timing that may be obtained with the control apparatus described above. With an auto-rich mixture setting the ignition timing is maintained in the normal position throughout the engine power (or intake airflow) range. With an auto-lean setting, the mixture strength may be automatically decreased to a "super" or "extra" lean setting within a predetermined portion of the cruising range and the timing may be automatically advanced simultaneously with the change in mixture strength.

This invention may be used with the water injection apparatus of my application Serial No. 529,104, referred to above, or with fuel injection systems in which the fuel is directly injected into the engine combustion chamber or chambers. The invention, of course, is not limited to the specific embodiment herein illustrated and described, but may be used in other ways without departure from its spirit as defined by the following claims.

I claim:

1. A control apparatus for an aircraft engine having a supercharger, comprising, a fuel-air ratio control means having metering jets including an auxiliary jet for establishing normal fuel-air ratios throughout the engine power range, valve means connected with the inlet and outlet of said supercharger for shutting off the flow of fuel through said auxiliary jet within a predetermined intermediate portion of the engine power range, and an engine control device operatively associated with said valve means.

2. In an aircraft engine having an automatically operative ignition timing mechanism for varying the spark advance of said engine in accordance with variations in engine operating conditions, a fuel-air ratio control apparatus having fuel flow control means including a fuel flow restriction for establishing normal fuel-air ratios throughout the engine power operating range, and first and second means respectively responsive to first and second fluid pressure differentials for controlling the flow of fuel through said restriction to vary said normal fuel-air ratios in accordance with variations in said spark advance.

3. In combination with an internal combustion engine having a supercharger, a valve for controlling the flow of fuel to said engine, a valve for controlling the ignition timing of said engine, fluid pressure responsive means for operating said valves, and conduits connecting said fluid pressure responsive means with the inlet and outlet of said supercharger.

4. In an aircraft engine having an adjustable ignition timing mechanism and an adjustable fuel-air ratio control means, means for actuating said timing mechanism and said control means in accordance with a change in engine operating conditions, and an engine intake airflow responsive means for controlling the actuation of said timing mechanism and said control means by said actuating means.

5. In an internal combustion aircraft engine having an air intake passage, an engine driven supercharger in said passage, a throttle valve in said passage upstream of said supercharger, a first fluid conduit connected through a flow restriction with said passage between said throttle and said supercharger, a second fluid conduit connected through a flow restriction with said passage downstream of said supercharger, and means responsive to a fluid pressure differential between said first and second conduits for varying the ignition timing and the charge mixture strength of said engine.

6. The apparatus of claim 5, including at least one by-pass means having a flow capacity greater than said restrictions for approximately equalizing the fluid pressures in said first and second conduits under predetermined engine operating conditions.

7. In an aircraft engine having an adjustable ignition timing mechanism and an adjustable fuel-air ratio control means, means for actuating said timing mechanism and said control means in accordance with a change in engine operating conditions, and a plurality of devices for controlling the actuation of said timing mechanism and said control means by said actuating means, said devices including a control actuated in accordance with a change in engine intake airflow, a control actuated in accordance with a change in the speed of a supercharger driven by said engine, and a control actuated in accordance with a change in the fuel-air ratio of a combustible charge for said engine.

8. In an engine, spark advancing means, fuel-air ratio reducing means, actuating means common to both said advancing means and said reducing means, and means for disabling said actuating means in accordance with a predetermined change in engine operating conditions.

9. The combination of claim 8, in which said engine is provided with a supercharger and in which said advancing means and said reducing means are both actuated by the pressure rise across said supercharger.

10. The combination of claim 8, in which said engine is provided with a supercharger driven by said engine and in which said disabling means is actuated in accordance with a change in the speed of said supercharger relative to said engine.

11. The combination of claim 8, in which said disabling means is actuated in accordance with a predetermined change in the mass rate of flow of engine intake air.

12. The combination of claim 8, in which said disabling means is actuated in accordance with the operation of a control device for regulating the fuel mixture strength of said engine.

13. In an aircraft engine having a supercharger, a carburetor having a metering jet and a first valve for controlling the flow through said jet to provide rich and lean charge mixture strengths, means for by-passing fuel from said metering jet around said valve, a second valve, means biasing said second valve to open position, and a second metering jet in said by-pass, means including an expansible chamber responsive to an increase in the pressure rise across said supercharger beyond a predetermined value for closing said second valve to cut off the flow of fuel through said by-pass and separate means including an expansible chamber responsive to engine intake airflow for permitting said second valve to be opened by said biasing means to enable fuel to flow through said by-pass upon an increase in the engine intake airflow beyond a predetermined value.

ROBERT C. PALMER, Jr.

REFERENCES CITED

The following references are of record in the file of this patent:

UNITED STATES PATENTS

| Number | Name | Date |
| --- | --- | --- |
| 1,967,619 | Justheim | July 24, 1934 |
| 2,217,364 | Halford et al. | Oct. 8, 1940 |
| Re. 22,447 | Hersey | Feb. 29, 1944 |
| 2,361,227 | Mock | Oct. 24, 1944 |
| 2,361,228 | Mock | Oct. 24, 1944 |
| 2,372,356 | Chandler | Mar. 27, 1945 |

FOREIGN PATENTS

| Number | Country | Date |
| --- | --- | --- |
| 523,895 | Great Britain | July 25, 1940 |